(12) United States Patent
Yamashita et al.

(10) Patent No.: US 11,183,852 B2
(45) Date of Patent: Nov. 23, 2021

(54) INVERTER GENERATOR FOR SYNCHRONIZING A PHASE OF AN OUTPUT VOLTAGE AND CONTROL METHOD THEREOF

(71) Applicant: SHINDENGEN ELECTRIC MANUFACTURING CO., LTD., Tokyo (JP)

(72) Inventors: Kazuo Yamashita, Hanno (JP); Yasukazu Yamaguchi, Hanno (JP)

(73) Assignee: SHINDENGEN ELECTRIC MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/076,670

(22) PCT Filed: Dec. 12, 2017

(86) PCT No.: PCT/JP2017/044501
§ 371 (c)(1),
(2) Date: Aug. 8, 2018

(87) PCT Pub. No.: WO2019/116440
PCT Pub. Date: Jun. 20, 2019

(65) Prior Publication Data
US 2021/0175819 A1 Jun. 10, 2021

(51) Int. Cl.
*H02J 3/46* (2006.01)
*H02J 3/40* (2006.01)
(Continued)

(52) U.S. Cl.
CPC ............. *H02J 3/40* (2013.01); *H02J 3/42* (2013.01); *H02J 3/46* (2013.01); *H02M 7/493* (2013.01)

(58) Field of Classification Search
CPC .................................................. H02J 3/40–46
See application file for complete search history.

(56) References Cited

U.S. PATENT DOCUMENTS 6,281,664 B1   8/2001  Nakamura et al.
2006/0193158 A1  8/2006  Et Al.
(Continued)

FOREIGN PATENT DOCUMENTS

JP   2000209872 A   7/2000
JP   2006217780 A   8/2006
(Continued)

OTHER PUBLICATIONS

Azrik, M., Khaled H. Ahmed, Stephen J. Finney, and Barry W. Williams. "Voltage synchronization scheme based on zero crossing detection for parallel connected inverters in AC microgrids." In 2012 IEEE International Symposium on Industrial Electronics, pp. 588-593. IEEE, 2012. (Year: 2012).*

(Continued)

*Primary Examiner* — Peter M Novak
(74) *Attorney, Agent, or Firm* — Ladas & Parry, LLP

(57) ABSTRACT

A control unit repeats the series of processing of comparing a first phase representing a phase of the first reference sine wave and being a phase included in the first synchronization signal, with a second phase that is the phase of the second reference sine wave when the first synchronization signal is received when the communication unit receives the first synchronization signal from the other inverter generator, changing a phase change amount per unit time of the second reference sine wave in accordance with the comparison result, continuing to update the phase of the second reference sine wave so that the phase of the second reference sine wave changes with a phase change amount per unit time after the change with reference to the first phase until the next first synchronizing signal is received from the other inverter generator.

11 Claims, 5 Drawing Sheets

(51) Int. Cl.
 *H02J 3/42* (2006.01)
 *H02M 7/493* (2007.01)

(56) References Cited

U.S. PATENT DOCUMENTS

| | | | |
|---|---|---|---|
| 2014/0169053 A1* | 6/2014 | Ilic | H02J 3/387 363/132 |
| 2015/0357822 A1 | 12/2015 | Yokokawa et al. | |
| 2017/0279280 A1* | 9/2017 | Shakeel | H02J 3/40 |
| 2018/0287391 A1* | 10/2018 | Shibata | H02P 9/02 |
| 2020/0227919 A1* | 7/2020 | Yuan | H02J 3/38 |

FOREIGN PATENT DOCUMENTS

| | | | |
|---|---|---|---|
| JP | 2010110027 A | 5/2010 | |
| JP | 2015231264 A | 12/2015 | |

OTHER PUBLICATIONS

International Search Report for PCT/JP2017/044501 dated Mar. 20, 2018 and its English translation from Google Translate.
Written Opinion of the International Searching Authority for PCT/JP2017/044501 dated Mar. 20, 2018 and its English translation from Google Translate.

* cited by examiner

INVERTER GENERATOR FOR SYNCHRONIZING A PHASE OF AN OUTPUT VOLTAGE AND CONTROL METHOD THEREOF

The present application is the U.S. national phase of PCT Application PCT/JP2017/044501 filed on Dec. 12, 2017, the disclosure of which is incorporated herein by reference in its entirety.

TECHNICAL FIELD

The present invention relates to an inverter generator and control method.

BACKGROUND ART

In order to synchronize the phases of the output voltages between two inverter generators when superimposing the output voltage from the two inverter generators and outputting them, a synchronization signal is transmitted from one inverter generator to the other inverter generator. For example, Patent Document 1 discloses that when the value of the counter of one other inverter generator becomes the setting counter value "127" corresponding to the timing when the polarity of the output voltage becomes positive from negative, the other inverter generator informs that the phase of the output voltage of the other inverter generator is 360 degrees by switching the output level of a synchronization signal outputting from the other inverter generator to the self-inverter generator from the high level to the low level. It is disclosed that at this time, when the counter of the self-inverter generator is "126" which is one smaller than the set counter value "127", that it is regarded that the phase of the self-inverter generator is delayed and that the cycle of the output voltage of the self-inverter generator is shortened by 12.8 µs.

CITATION LIST

Patent Literature

Patent Literature 1: JP2010-110027

SUMMARY OF INVENTION

Problem to be Solved

However, there is a problem that when the time interval between the signals of the synchronization signal sent intermittently is rather long, the polarity reversal timing (also referred to as the zero crossing point) at which the phase of the output voltage of the other inverter generator becomes 360 degrees can not be predicted with high accuracy.

The present invention has been made in view of the above problem, and has an object to provide an inverter generator and a control method making it possible to improve the prediction accuracy of the polarity reversal timing in the output voltage outputted by the other inverter generator.

Means for Solving the Problem

An inverter generator according to a 1st aspect of the present invention, for synchronizing a phase of an output voltage by communicating with one other inverter generator, comprising:

a communication unit that intermittently receives a first synchronization signal including a first phase of a first reference sine wave from the other inverter generator that outputs a first output voltage based on the first reference sine wave;

an output circuit for outputting a second output voltage; and a control unit that controls the output circuit based on a second reference sine wave, wherein the control unit repeats a series of processing of:

comparing the first phase representing a phase of the first reference sine wave and being a phase included in the first synchronization signal, with a second phase that is the phase of the second reference sine wave when the first synchronization signal is received when the communication unit receives the first synchronization signal from the other inverter generator, changing a first phase change amount per unit time of the second reference sine wave in accordance with the comparison result, continuing to update the phase of the second reference sine wave so that the second phase of the second reference sine wave changes with the first phase change amount per unit time after the change with reference to the first phase until the next first synchronizing signal is received from the other inverter generator, the control unit compares a third phase that is a phase included in the first synchronization signal received prior to the polarity reversal timing of the second reference sine wave by the communication unit, with a fourth phase that is a phase of the second reference sine wave when the first synchronizing signal is received, changing a second phase change amount per unit time of the second reference sine wave in accordance with the comparison result, and continues to update the fourth phase of the second reference sine wave so that the phase of the second reference sine wave changes with the changed second phase change amount per unit time to predict the polarity reversal timing of the first reference sine wave.

An inverter generator according to a 2nd aspect of the present invention, wherein in the 1st aspect of the present invention, the communication unit receives the first synchronization signal at an every first set time, the control unit predicts the polarity reversal timing of the first reference sine wave by repeating adding the phase change amount per unit time after the change to the fourth phase at every second set time shorter than the first set time, to the fourth phase representing the second reference sine wave at the time of receiving the most recently received first synchronizing signal among the first synchronizing signals received before the polarity reversal timing of the second reference sine wave by the communication unit.

An inverter generator according to a 3rd aspect of the present invention, wherein in the 1st or the 2nd aspect of the present invention, the communication unit receives the first synchronization signal at an every first set time, a time interval for updating the phase of the second reference sine wave is a second set time shorter than the first set time, and when updating the phase of the second reference sine wave, the control unit adds a phase change amount per the second set time of the second reference sine wave after the change to the second phase at the every second set time.

An inverter generator according to a 4th aspect of the present invention, wherein in the 3rd aspect of the present invention, the control unit increases the phase change amount per the second set time of the second reference sine wave when the second phase is behind the first phase, decreases the phase change amount per the second set time of the second reference sine wave when the second phase is earlier than the first phase.

An inverter generator according to a 5th aspect of the present invention, wherein in the 1st or the 2nd aspect of the present invention, the communication unit receives the first synchronization signal at an every first set time, a time interval for updating the phase of the second reference sine wave is a second set time shorter than the first set time, the control unit changes the phase change amount per unit time of the second reference sine wave by changing the time interval for updating the phase of the second reference sine wave, adds the set phase addition amount to the second phase at each time interval after the change when updating the phase of the second reference sine wave.

An inverter generator according to a 6th aspect of the present invention, wherein in the 5th aspect of the present invention, the control unit shortens the time interval for updating the phase of the second reference sine wave when the second phase is behind the first phase, lengthens the time interval for updating the phase of the second reference sine wave when the second phase is earlier than the first phase.

An inverter generator according to a 7th aspect of the present invention, wherein in any one of the 1$^{st}$ to 6th aspect of the present invention, the control unit determines a change amount of the phase change amount per unit time of the second reference sine wave in accordance with a magnitude of a difference between the first phase and the second phase at the time of receiving the first synchronization signal.

An inverter generator according to a 8th aspect of the present invention, wherein in any one of the 1$^{st}$ to 7th aspect of the present invention, the control unit controls the communication unit to transmit a second synchronization signal including a phase of the second reference sine wave to the other inverter generator, the other inverter generator compares the phase of the first reference sine wave with the phase of the second reference sine wave, updates the phase of the first reference sine wave in accordance with the comparison result, transmits the first synchronization signal including the updated phase, the communication unit receives a first synchronization signal including the updated phase, and repeats the series of processing using the phase included in the first synchronization signal.

An inverter generator according to a 9th aspect of the present invention, wherein in any one of the 1$^{st}$ to 8th aspect of the present invention, the first synchronization signal is a packet including the phase of the first reference sine wave and an error detection code.

An inverter generator according to a 10th aspect of the present invention, wherein in any one of the 1$^{st}$ to 9th aspect of the present invention, the control unit controls the output circuit so as to start outputting the second output voltage at the predicted polarity reversal timing.

A control method according to a 11th aspect of the present invention, executed by an inverter generator for synchronizing the phase of the output voltage by communicating with one other inverter generator, comprising a communication unit that intermittently receives a first synchronization signal including a first phase of the first reference sine wave from the other inverter generator that outputs a first output voltage based on the first reference sine wave; an output circuit for outputting a second output voltage; and a control unit that controls the output circuit based on a second reference sine wave, wherein the control unit repeats a series of processing of:

comparing the first phase representing a phase of the first reference sine wave and being a phase included in the first synchronization signal, with a second phase that is the phase of the second reference sine wave when the communication unit receives the first synchronization signal from the other inverter generator, changing a first phase change amount per unit time of the second reference sine wave in accordance with a comparison result, continuing to update the second phase of the second reference sine wave so that the second phase of the second reference sine wave changes with the first phase change amount per unit time after the change with reference to the first phase until a next first synchronizing signal is received from the other inverter generator, the control unit compares a third phase that is a phase included in the first synchronization signal received prior to the polarity reversal timing of the second reference sine wave by the communication unit and that is one of the first phases, with a fourth phase that is a phase of the second reference sine wave when the first synchronizing signal is received, changing a second phase change amount per unit time of the second reference sine wave in accordance with a comparison result, and continues to update the fourth phase of the second reference sine wave so that the fourth phase of the second reference sine wave changes with the changed second phase change amount per unit time to predict the polarity reversal timing of the first reference sine wave.

Advantageous Effects of Invention

An inverter generator according to a one aspect of the present invention, by repeating the process of changing the phase change amount per unit time of the second reference sine wave, the phase of the second reference sine wave of the inverter generator gradually approaches asymptotically to the phase of the first reference sine wave of the other inverter generator. The inverter generator compares the fourth phase which is the asymptotic phase is compared with the third phase included in the first synchronization signal received before the polarity reversal timing, further changes the phase change amount per unit time of the second reference sine wave according to the comparison result, and predicts the polarity reversal timing of the first reference sine wave by updating the phase of the second reference sine wave so that the phase of the second reference sine wave is changed by the phase change amount per unit time of the second reference sine wave after the change. Therefore, as the prediction accuracy of the polarity reversal timing of the first reference sine wave can be improved, the prediction accuracy of the polarity reversal timing of the output voltage of the other inverter generator output based on the first reference sine wave can be improved.

DESCRIPTION OF EMBODIMENTS

Figure 1:
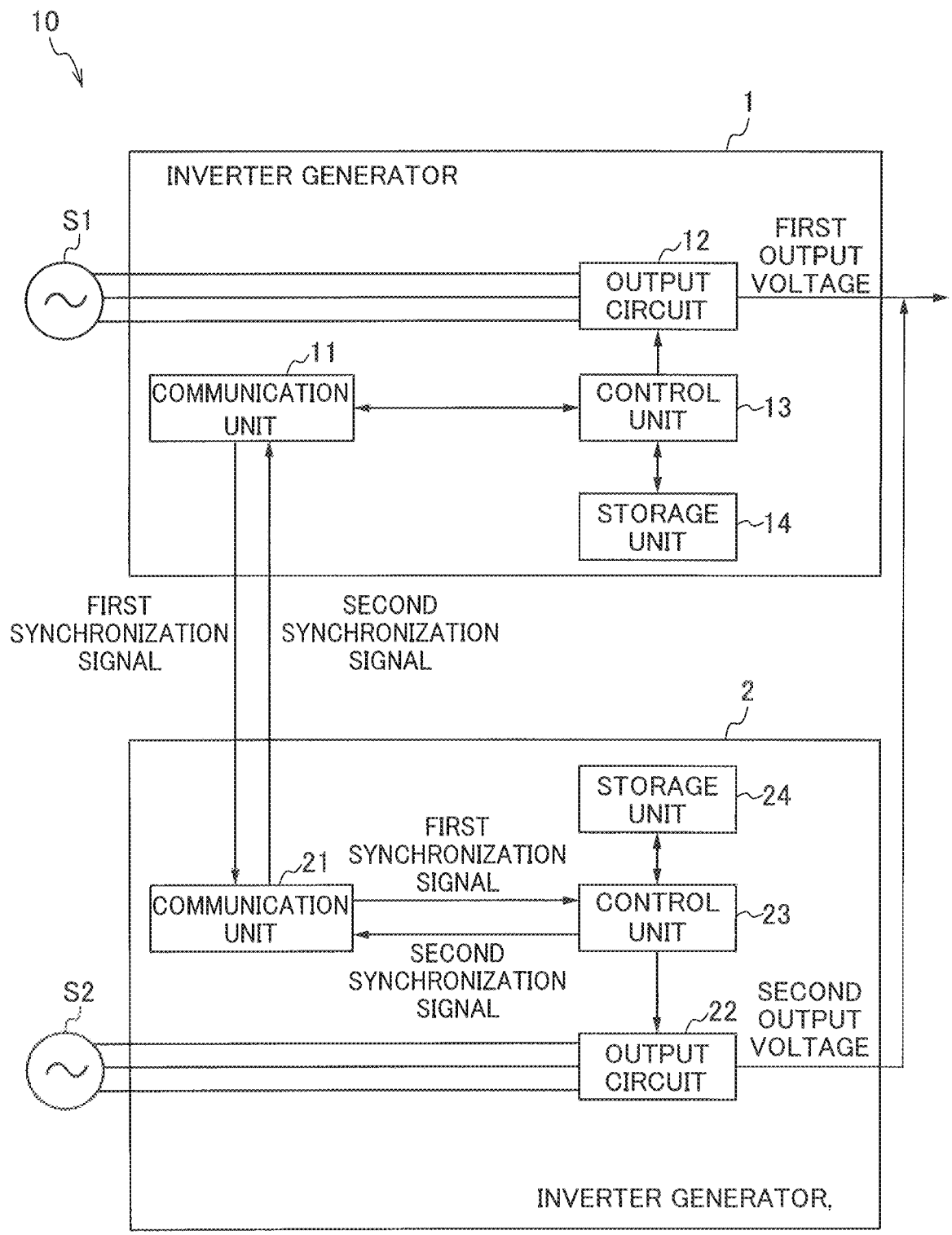
FIG. 1 is a diagram illustrating an example of a configuration of an inverter power generation system according to an embodiment of the present invention.

Hereinafter, embodiments of the present invention will be described with reference to the drawings. In FIG. 1, an inverter power generation system 10 according to an embodiment of the present invention includes an inverter generator 1 (also referred to as one other inverter generator) and an inverter generator 2. The inverter power generation system 10 aligns the phase of the first output voltage outputted from the inverter generator 1 and the phase of the second output voltage outputted from the inverter generator 2 and superimposes the first output voltage and the second output voltage and outputs it. In the present embodiment, the first output voltage and the second output voltage are sine alternating voltages, where the phases of the first output voltage and the second output voltage are aligned so that the voltage output after superimposing the first output voltage and the second output voltage also becomes a sinusoidal alternating voltage, and the inverter power generation system 10 can output the sinusoidal alternating voltage.

The inverter generator 1 and the inverter generator 2 synchronize the phases of the output voltages with each other by communicating with the other inverter generators.

The inverter generator 1 is connected to a power supply S1, and a power supply voltage is supplied from a power supply S1. Here, the inverter generator 1 includes a communication unit 11, an output circuit 12, a control unit 13, and a storage unit 14.

The communication unit 11 communicates with a later-described communication unit 21 of the inverter generator 2. This communication may be wired or wireless. Specifically, the communication unit 11 intermittently receives the second synchronization signal including the phase of the second reference sine wave generated by the inverter generator 2. Here, the first synchronization signal is a packet including the phase of the first reference sine wave and the error detection code.

Further, the communication unit 11 intermittently transmits the first synchronization signal including the phase of the first reference sine wave generated by the control unit 13. Here, the first synchronization signal is a packet including the phase of the first reference sine wave and the error detection code. Since the error detection code is included in the first synchronization signal, when the value of the phase of the first reference sine wave included in the first synchronization signal deviates from the original value due to noise mixing during communication, the inverter generator 2 can detect the error using the error detection code. Then, the inverter generator 2 requests the retransmission of the packet and receives the same first synchronization signal again, so that the correct phase can be received.

The output circuit 12 is connected to the power supply S1 and outputs the first output voltage using the voltage supplied from the power supply S1.

The control unit 13 is connected to the communication unit 11, the output circuit 12, and the storage unit 14, and controls the communication unit 11 and the output circuit 12. For example, the control unit 13 generates a first reference sine wave, and controls the output circuit 12 based on the generated first reference sine wave. As a result, the inverter generator 1 outputs the first output voltage based on the first reference sine wave.

The storage unit 14 can store data.

Similarly, the inverter generator 2 is connected to the power source S2, and the power source voltage is supplied from the power source S2. Here, the inverter generator 2 includes a communication unit 21, an output circuit 22, a control unit 23, and a storage unit 24.

The communication unit 21 communicates with the communication unit 11 of the inverter generator 1. This communication may be wired or wireless. Specifically, the communication unit 21 intermittently receives the first synchronization signal including the phase of the first reference sine wave generated by the inverter generator 1. Further, the communication unit 21 intermittently transmits the second synchronization signal including the phase of the second reference sine wave generated by the control unit 23. Here, the second synchronization signal is a packet including the phase of the second reference sine wave and the error detection code. Since the second synchronization signal includes an error detection code, when the value of the phase of the second reference sine wave included in the second synchronization signal deviates from the original value due to noise mixing during communication, the inverter generator 1 can detect the error using the error detection code. Then, the inverter generator 1 requests the retransmission of the packet and receives the same second synchronization signal again, so that the correct phase can be received.

The output circuit 22 is connected to the power source S2 and outputs the second output voltage using the voltage supplied from the power source S2.

The control unit 23 is connected to the communication unit 21, the output circuit 22, and the storage unit 24, and controls the communication unit 21 and the output circuit 22. For example, the control unit 23 generates a second reference sine wave, and controls the output circuit 22 based on the generated second reference sine wave. In this way, the inverter generator 2 outputs the second output voltage based on the second reference sine wave.

The storage unit 24 can store data.

<Details of the Configuration of the Control Unit 23>

Subsequently, a functional configuration of the control unit 23 will be described with reference to FIG. 2. Since the functional configuration of the control unit 13 is similar to that of the control unit 23, a detailed description thereof will be omitted.

Figure 2:
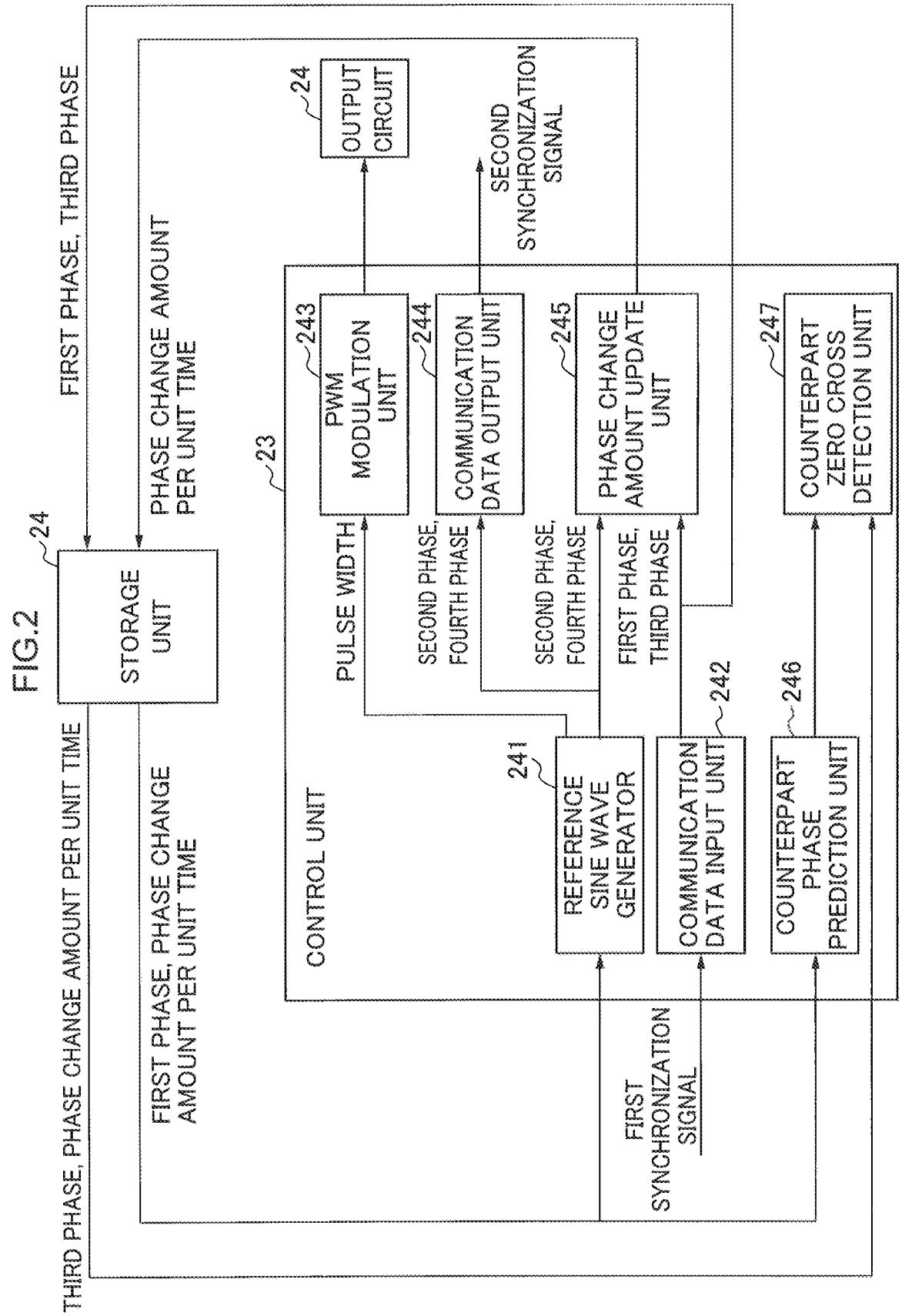
FIG. 2 is a diagram showing an example of a configuration of a control unit of an inverter generator according to an embodiment of the present invention.

In the FIG. 2, the control unit 23 includes a reference sine wave generation unit 241, a communication data input unit 242, a PWM modulation unit 243, a communication data output unit 244, a phase change amount update unit 245, a counterpart phase prediction unit 246, a counterpart zero cross detection unit 247.

The reference sine wave generating unit 241 reads out the phase change amount per unit time stored in the storage unit 24 and generates the second reference sine wave so that the phase change amount per unit time of the first reference sine wave becomes the phase change amount per unit time read out. The reference sine wave generator 241 outputs the time series data of the pulse width for the PWM signal to the PWM modulator 243 so as to generate the PWM signal corresponding to the generated second reference sine wave.

Further, the reference sine wave generator 241 outputs the second phase, which is the phase of the second reference sine wave when the communication unit 21 receives the first synchronization signal, to the communication data output unit 244 and the phase change amount update unit 245. Further, the reference sine wave generator 241 outputs the fourth phase, which is the phase of the second reference sine wave when the communication unit 21 receives the first synchronization signal before the polarity reversal timing of the second reference sine wave, to the communication data output unit 244 and the phase change amount update unit 245. In the present embodiment, as an example, the first synchronization signal received before this polarity reversal timing is the first synchronization signal received earlier among the two first synchronization signals received with the polarity reversal timing interposed therebetween.

The communication data input unit 242 receives the first synchronization signal received by the communication unit 21. The communication data input unit 242 acquires a first phase representing the phase of the first reference sine wave from the first synchronization signal and being a phase included in the first synchronization signal. The communication data input unit 242 outputs the acquired first phase to the phase change amount update unit 245. The communication data input unit 242 also stores the acquired first phase in the storage unit 24.

Further, the communication data input unit 242 acquires the third phase, which is one of the first phases and which is a phase included in the first synchronization signal received by the communication unit 21 before the polarity reversal timing of the second reference sine wave, from the first synchronization signal. In the present embodiment, as an example, the first synchronization signal received before this polarity reversal timing is the first synchronization signal received earlier among the two first synchronization signals received with the polarity reversal timing interposed therebetween. The communication data input unit 242 outputs the acquired third phase to the phase change amount update unit 245. The communication data input unit 242 also stores the acquired third phase in the storage unit 24.

The PWM modulation unit 243 generates a switching signal using the time-series data of the pulse width for the PWM signal, and transmits the generated switching signal to the output circuit 22. As a result, the output circuit 22 generates the second output voltage by turning on and off the internal switch circuit based on the switching signal.

When the second phase is input, the communication data output unit 244 outputs the second synchronization signal including the second phase to the communication unit 21. As a result, the communication unit 21 can transmit the second synchronization signal to the inverter generator 1.

Similarly, when the fourth phase is input, the communication data output unit 244 outputs the second synchronization signal including the fourth phase to the communication unit 21. As a result, the communication unit 21 can transmit the second synchronization signal to the inverter generator 1.

The phase change amount update unit 245 compares the first phase representing the phase of the first reference sine wave and being a phase included in the first synchronization signal, with the second phase which is a phase of the second reference sine wave at the time of receiving the first synchronizing signal, and changes the phase change amount per unit time of the second reference sine wave according to the comparison result.

At that time, for example, when the second phase lags behind the first phase (that is, the phase of itself is behind the phases of the other inverter generators), the phase change amount update unit 245 increases the phase change amount per second set time of the second reference sine wave. As a result, it is possible to advance the phase itself and keep up with the phases of other inverter generators. On the other hand, for example, when the second phase is earlier than the first phase (that is, the phase of itself is earlier than the phase of another inverter generator), the phase change amount update unit 245 may reduce the phase change amount per second set time of the second reference sine wave. As a result, it is possible to delay the phase advancement of itself and bring it closer to the phase of the other inverter generator.

Alternatively, for example, when the second phase lags behind the first phase (that is, the phase of itself is behind the phase of another inverter generator), the phase change amount update unit 245 may shorten a time interval for updating the phase of the second reference sine wave. As a result, it is possible to advance the phase advance of itself and keep up with the phases of other inverter generators.

Further, when the second phase is earlier than the first phase (that is, the phase of itself is earlier than the phase of the other inverter generator), the phase change amount update unit 245 may lengthen a time interval for updating the phase of the second reference sine wave. As a result, it is possible to delay the phase advancement of itself and bring it closer to the phase of the other inverter generator. The phase change amount update unit 245 saves the changed phase change amount per unit time in the storage unit 24.

The counterpart phase prediction unit 246 reads the first phase and the phase change amount per unit time after the change from the storage unit 24. Further, the counterpart phase prediction unit 246 reads out the first phase stored in the storage unit 24.

Then, the counterpart phase prediction unit 246 continues to update the phase of the second reference sine wave so that the phase of the reference sine wave changes at the phase change amount per unit time after the change with reference to the first phase until the communication unit 21 receives the next first synchronization signal from the inverter generator 1.

Here, a specific example of phase update will be described. As a premise, the communication unit 21 receives the first synchronization signal at every first set time, and the time interval for updating the phase of the second reference sine wave at the control unit 23 is a second set time shorter than this first set time. That is, it is assumed that the update interval of the phase of the second reference sine wave is shorter than the reception interval of the first synchronization signal.

In this premise, when updating the phase of the second reference sine wave, the control unit 23 may add the phase change amount per second set time of the second reference sine wave after the change, to the second phase. As a result, the control unit 23 can update the phase of the second reference sine wave so that the phase of the second reference sine wave changes with the phase change amount per unit time after the change.

Alternatively, in the above premise, the control unit 23 changes the phase change amount per unit time of the second reference sine wave by changing the time interval for updating the phase of the second reference sine wave, and when updating the phase of the second reference sine wave, the control unit 23 may add the set phase addition amount to the second phase at each changed time interval. As a result, the control unit 23 can update the phase of the second reference sine wave so that the phase of the second reference sine wave changes with the phase change amount per unit time after the change.

The control unit 23 may determine the phase change amount per unit time of the second reference sine wave in accordance with the magnitude of the difference between the first phase and the second phase when receiving the first synchronization signal. Thus, when the difference between the first phase and the second phase at the time of receiving the first synchronization signal is large, the amount of change in the phase change amount per unit time of the second reference sine wave can be increased, it is possible to bring the phase of the second reference sine wave of the inverter generator 2 closer to the phase of the first reference sine wave of the inverter generator 1 earlier. On the other hand, when the difference between the first phase and the second phase at the time of receiving the first synchronization signal is small, it is possible to reduce the change amount of the phase change amount per unit time of the second reference sine wave, and it is possible to bring the phase of the second reference sine wave of the inverter generator 2 closer to the phase of the first reference sine wave of the inverter generator 1 earlier.

As described above, the control unit 23 repeats a series of processes of changing the phase change amount per unit time of the second reference sine wave at every time the first synchronization signal is received, and after changing, continuing updating the phase of the second reference sine wave so that the phase of the second reference sine wave changes with the phase change amount per unit time after the change until the next first synchronization signal is received.

Further, the control unit 23 controls the communication unit 21 to transmit the second synchronization signal including the phase of the second reference sine wave to the inverter generator 1, the inverter generator 1 compares the phase of the first reference sine wave with the phase of the second reference sine wave, updates the phase of the first reference sine wave according to the comparison result, transmitting the first synchronization signal including the updated phase, the communication unit 21 receives the first synchronization signal including the updated phase and repeats the series of processing using the phase included in the first synchronization signal.

The phase change amount update unit 245 compares the third phase that is included in the first synchronization signal received before the polarity reversal timing of the second reference sine wave by the communication unit 21 and that is one of the first phases, with the fourth phase which is a phase of the second reference sine wave at the time of receiving the first synchronizing signal, and changes the phase change amount per unit time of the second reference sine wave according to the comparison result. The phase change amount update unit 245 saves the changed phase change amount per unit time in the storage unit 24.

The counterpart zero cross detection unit 247 reads the third phase and the phase change amount per unit time after the change from the memory 24. The counterpart zero cross detection unit 247 predicts the polarity reversal timing of the first reference sine wave by continuing updating the phase of the second reference sine wave so that the phase of the second reference sine wave changes with the phase change amount per unit time after the change with reference to the third phase to.

Here, in the present embodiment, the communication unit 21 receives the first synchronization signal at every first set time. In this case, the counterpart zero cross detection unit 247 predicts the polarity reversal timing of the first reference sine wave by repeating addition of the phase change amount per unit time after the change to the fourth phase at every second set time shorter than the first set time, the fourth phase being a phase of the second reference sine wave at the time of receiving the most recently received first synchronization signal among the first synchronization signals received before the polarity reversal timing of the second reference sine wave by the communication unit 21. Thereby, by repeating addition of the phase change amount per unit time after the change, it is possible to accurately predict the polarity reversal timing of the first reference sine wave.

For example, the control unit 23 controls the output circuit 22 so as to start outputting the second output voltage at the predicted polarity reversal timing. Thus, at the polarity reversal timing, the phase of the second output voltage can be matched with the phase of the first output voltage.

Figure 3:
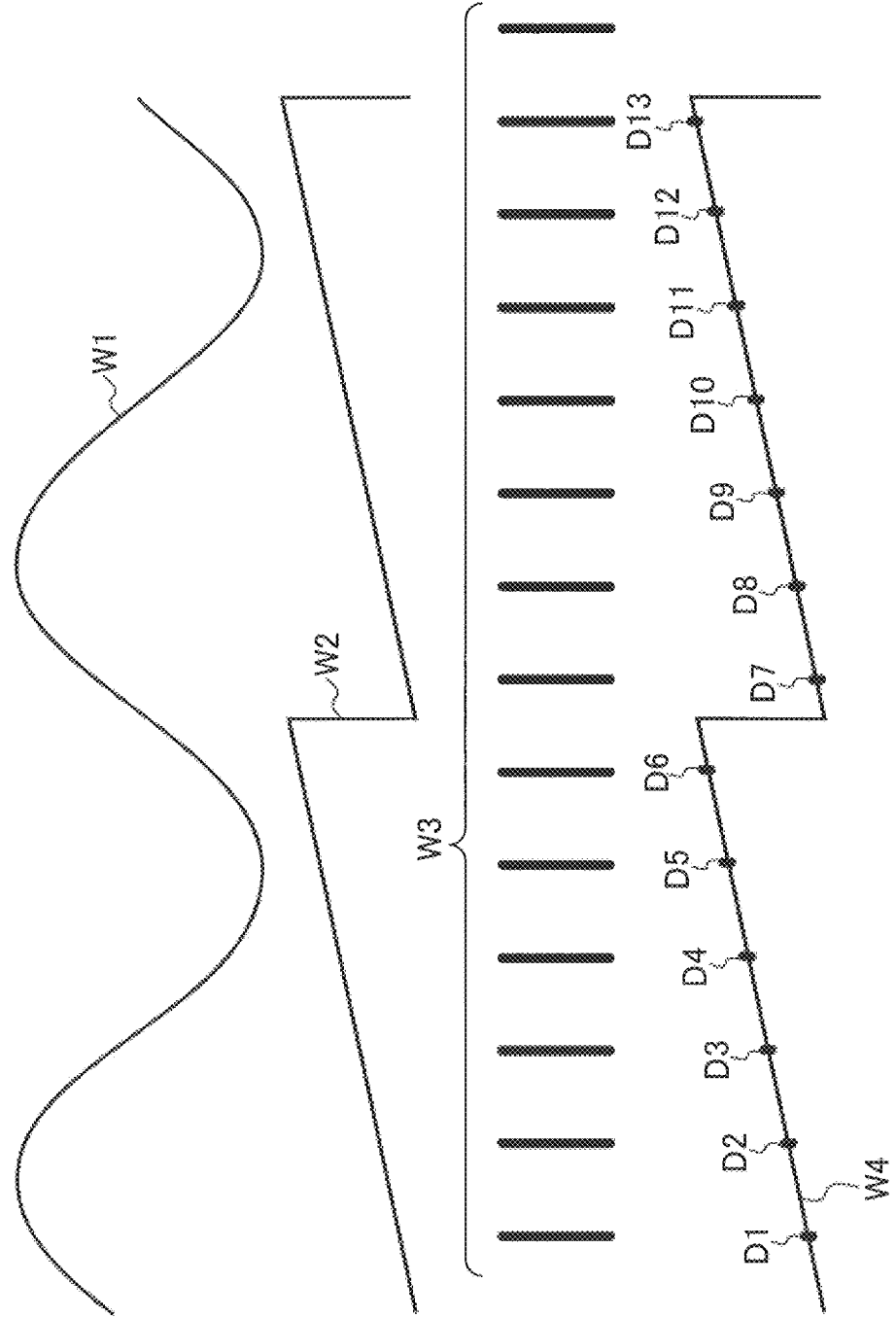
FIG. 3 is an example of a first reference sine wave, a time change of the first reference sine wave, a transmission timing of the second synchronization signal transmitted by the inverter generator 1, a phase included in the first synchronization signal, a predicted time change of the phase of the first reference sine wave.

Curve W1 in FIG. 3 represents the first reference sine wave of the inverter generator 1. The polygonal line W2 in FIG. 3 represents the time change of the phase included in the first synchronization signal, that is, the time change of the phase of the first reference sine wave of the inverter generator 1. A plurality of line segments W3 in FIG. 3 is the transmission timing of the second synchronization signal transmitted by the inverter generator 2. Dots D1 to D13 in FIG. 3 indicate phases included in the first synchronizing signal (that is, phases of the first reference sine wave) when the inverter generator 2 receives the first synchronizing signal transmitted from the inverter generator 1. A polygonal line W4 in FIG. 3 is a line connecting the dots D1 to D13 and represents a time change of the phase of the first reference sine wave predicted by the inverter generator 2.

Subsequently, by comparing the time change of the phase of the second reference sine wave between the comparative example (FIG. 4) in which the phase change amount is not updated and the present embodiment (FIG. 5) updating the phase change amount, the phase synchronization effect by updating the phase change amount according to this embodiment will be described.

Figure 4:
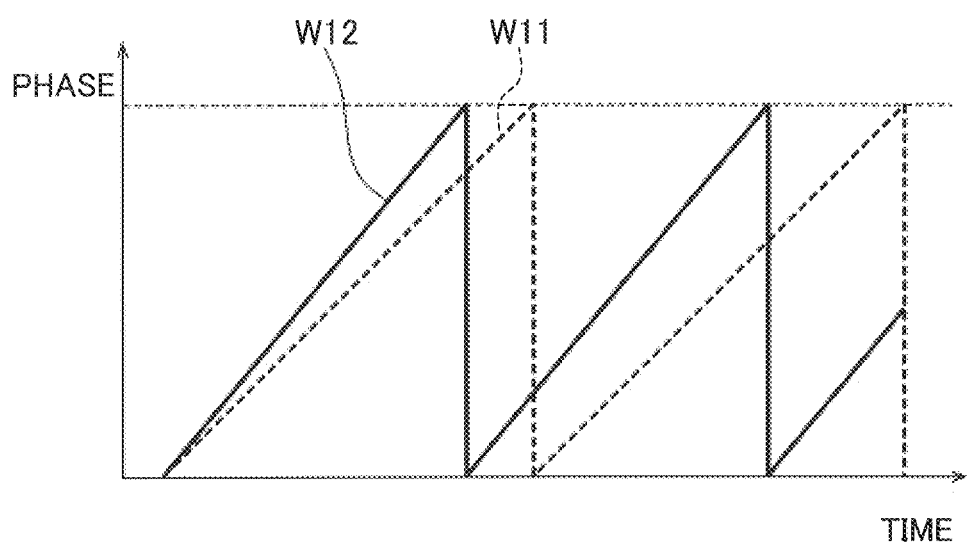
FIG. 4 is a diagram showing an example of the temporal change of the phase of the first reference sine wave and the phase of the second reference sine wave in the comparative example without updating the phase change amount.

In FIG. 4, polygonal line W 11 is a phase change of the first reference sine wave of inverter generator 1, the polygonal line W12 is a phase change of the second reference sine wave of the inverter generator 2 when the phase change amount per unit time is not updated as a comparative example. The polygonal line W12 does not approach the polygonal line W1*l* even if time passes.

Figure 5:
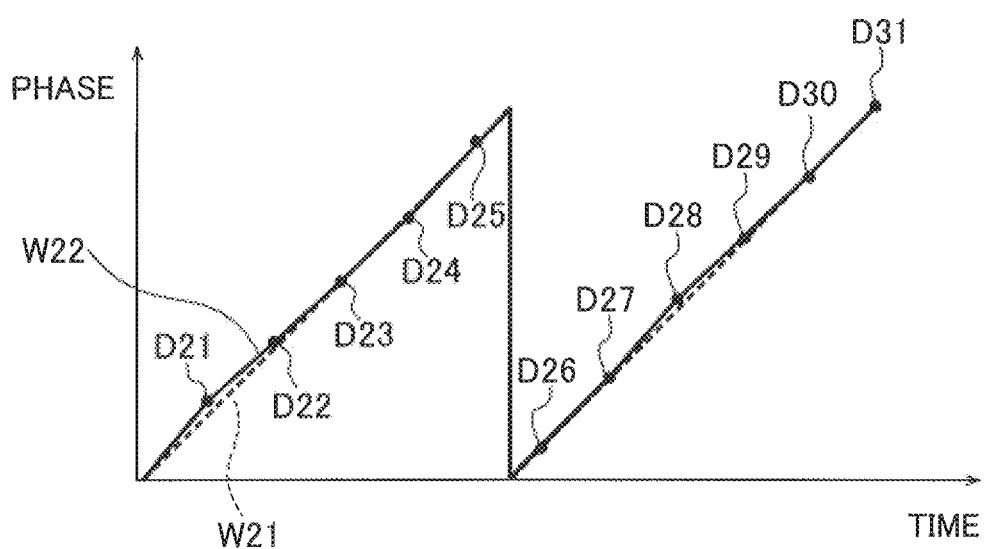
FIG. 5 is a diagram showing an example of the temporal change of the phase of the first reference sine wave and the phase of the second reference sine wave in the present embodiment for updating the phase change amount.

In FIG. 5, polygonal line W21 is a phase change of the first reference sine wave of inverter generator 1. Dots D21 to D31 in FIG. 5 represent the phases of the second reference sine wave when the inverter generator 2 receives the first synchronization signal transmitted from the inverter generator 1. Polyline W22 is a phase change of the second reference sine wave of the inverter generator 2 in the case of updating the phase change amount per unit time in the present embodiment. The broken line W22 is represented as connecting the dots D21 to D31.

As shown by broken line W22 in FIG. 5, in this embodiment, unlike the time change of the phase of the second reference sine wave according to the comparative example of FIG. 4, by updating the phase change amount per unit time, the phase of the second reference sine wave of the generator 2 approaches the phase of the first reference sine wave of the inverter generator 1.

For example, assuming that the phase in the dot D25 is the third phase, the control unit 23 can accurately predict the polarity reversal timing of the first reference sine wave by continuing updating the phase of the second reference sine wave so that the phase of the second reference sine wave changes with the phase change amount per unit time after the change with reference to the third phase.

As described above, in the inverter generator 2 according to the present embodiment, is an inverter generator for synchronizing the phase of the output voltage by communicating with one other inverter generator 1. The inverter generator 2 includes a communication unit 21 that intermittently receives a first synchronization signal including the phase of the first reference sine wave from the other inverter generator 1 that outputs a first output voltage based on the first reference sine wave. Furthermore, the inverter generator 2 includes an output circuit 22 for outputting a second output voltage. Furthermore, the inverter generator 2 includes a control unit 23 that controls the output circuit based on a second reference sine wave.

The control unit 23 repeats the series of processing of comparing a first phase representing a phase of the first reference sine wave and being a phase included in the first synchronization signal, with a second phase that is the phase of the second reference sine wave when the first synchronization signal is received when the communication unit receives the first synchronization signal from the other inverter generator 1, changing a phase change amount per unit time of the second reference sine wave in accordance with the comparison result, continuing to update the phase of the second reference sine wave so that the phase of the second reference sine wave changes with a phase change amount per unit time after the change with reference to the first phase until the next first synchronizing signal is received from the other inverter generator, The control unit 23 compares a third phase that is a phase included in the first synchronization signal received prior to the polarity reversal timing of the second reference sine wave by the communication unit 21 and that is one of the first phases, with a fourth phase that is a phase of the second reference sine wave when the first synchronizing signal is received, changing the phase change amount per unit time of the second reference sine wave in accordance with the comparison result, and predicts the polarity reversal timing of the first reference sine wave by continuing updating the phase of the second reference sine wave so that the phase of the second reference sine wave changes with a phase change amount per unit time after the change.

The inverter generator 2 according to the present embodiment, by repeating the process of changing the phase change amount per unit time of the second reference sine wave, the phase of the second reference sine wave of the inverter generator gradually approaches asymptotically to the phase of the first reference sine wave of the other inverter generator. The inverter generator 2 compares the fourth phase which is the asymptotic phase is compared with the third phase included in the first synchronization signal received before the polarity reversal timing (the zero crossing point), further changes the phase change amount per unit time of the second reference sine wave according to the comparison result, and predicts the polarity reversal timing of the first reference sine wave by updating the phase of the second reference sine wave so that the phase of the second reference sine wave is changed by the phase change amount per unit time of the second reference sine wave after the change. Therefore, as the prediction accuracy of the polarity reversal timing of the first reference sine wave can be improved, the prediction accuracy of the polarity reversal timing of the output voltage of the other inverter generator 1 output based on the first reference sine wave can be improved.

The embodiment is an example, and the scope of the invention is not limited thereto.

REFERENCE SIGNS LIST 1, 2 inverter generator,
10 inverter power generation system
11,21 communication unit
12, 22 output circuit
13,23 control unit
14,24 storage unit
241 reference sine wave generator
242 communication data input unit
243 PWM modulation unit
244 communication data output unit
245 phase change amount update unit
246 counterpart phase prediction unit
247 counterpart zero cross detection unit
S1, S2 power supply

The invention claimed is:

1. An inverter generator for synchronizing a phase of an output voltage by communicating with one other inverter generator, comprising:
a communication unit configured to intermittently receive a first synchronization signal including a first phase of a first reference sine wave from the other inverter generator that is configured to output a first output voltage based on the first reference sine wave;
an output circuit for outputting a second output voltage; and
a control unit configured to control the output circuit based on a second reference sine wave, wherein
the control unit is configured to repeat a series of processing of:
comparing the first phase of the first reference sine wave included in the first synchronization signal, with a second phase of the second reference sine wave when the communication unit receives the first synchronization signal from the other inverter generator, and changing a first phase change amount per unit time of the second reference sine wave in accordance with a comparison result,
continuing to update the second phase of the second reference sine wave so that the second phase of the second reference sine wave changes with the first phase change amount per unit time with reference to the first phase until a next first synchronization signal is received from the other inverter generator, and
the control unit is further configured to:
compare a third phase included in the first synchronization signal received by the communication unit prior to a polarity reversal timing of the second reference sine wave, with a fourth phase of the second reference sine wave when the first synchronization signal is received, and change a second phase change amount per unit time of the second reference sine wave in accordance with a comparison result, and
predict a polarity reversal timing of the first reference sine wave by continually updating the fourth phase of the second reference sine wave so that the fourth phase of the second reference sine wave changes with the changed second phase change amount per unit time.

2. The inverter generator according to claim 1, wherein
the communication unit is configured to receive the first synchronization signal at an every first set time,
the control unit is configured to predict the polarity reversal timing of the first reference sine wave by repeating addition of the second phase change amount per unit time after changing the fourth phase at an every second set time shorter than the first set time, the fourth phase representing the second reference sine wave at the time of receiving the most recently received first synchronization signal among first synchronizing signals received before the polarity reversal timing of the second reference sine wave by the communication unit.

3. The inverter generator according to claim 1, wherein the communication unit receives the first synchronization signal at an every first set time,
a time interval for updating the phase of the second reference sine wave is a second set time shorter than the first set time, and
when updating the phase of the second reference sine wave, the control unit is configured to add a changed phase change amount per the second set time of the second reference sine wave to the second phase at the every second set time.

4. The inverter generator according to claim 3, wherein the control unit is configured to increase the phase change amount per the second set time of the second reference sine wave when the second phase is behind the first phase, and decease the phase change amount per the second set time of the second reference sine wave when the second phase is earlier than the first phase.

5. The inverter generator according to claim 1, wherein the communication unit is configured to receive the first synchronization signal at an every first set time,
a time interval for updating the phase of the second reference sine wave is a second set time shorter than the first set time,
the control unit is configured to change the phase change amount per unit time of the second reference sine wave by changing the time interval for updating the phase of the second reference sine wave, and add a set phase addition amount to the second phase at each changed time interval when updating the phase of the second reference sine wave.

6. The inverter generator according to claim 5, wherein the control unit is configured to shorten the time interval for updating the phase of the second reference sine wave when the second phase is behind the first phase, to lengthen the time interval for updating the phase of the second reference sine wave when the second phase is earlier than the first phase.

7. The inverter generator according to claim 1, wherein the control unit is configured to determine a change amount of the phase change amount per unit time of the second reference sine wave in accordance with a magnitude of a difference between the first phase and the second phase at the time of receiving the first synchronization signal.

8. The inverter generator according to claim 1, wherein the control unit is configured to control the communication unit to transmit a second synchronization signal including the phase of the second reference sine wave to the other inverter generator,
the other inverter generator is configured to compare the phase of the first reference sine wave with the phase of the second reference sine wave, update the phase of the first reference sine wave in accordance with a comparison result, and transmit the first synchronization signal including the updated phase,
the communication unit is configured to receive the first synchronization signal including the updated phase, and repeat the series of processing using the phase included in the first synchronization signal.

9. The inverter generator according to claim 1, wherein the first synchronization signal is a packet including the phase of the first reference sine wave and an error detection code.

10. The inverter generator according to claim 1, wherein the control unit is configured to control the output circuit so as to start outputting the second output voltage at a predicted polarity reversal timing.

11. A control method executed by an inverter generator for synchronizing a phase of an output voltage by communicating with one other inverter generator, comprising a communication unit configured to intermittently receive a first synchronization signal including a first phase of a first reference sine wave from the other inverter generator that is configured to output a first output voltage based on the first reference sine wave; an output circuit for outputting a second output voltage; and a control unit configured to control the output circuit based on a second reference sine wave, wherein
the control unit is configured to repeat a series of processing of:
comparing the first phase the first reference sine wave included in the first synchronization signal, with a second phase of the second reference sine wave when the communication unit receives the first synchronization signal from the other inverter generator, changing a first phase change amount per unit time of the second reference sine wave in accordance with a comparison result,
continuing to update the second phase of the second reference sine wave so that the second phase of the second reference sine wave changes with the first phase change amount per unit time with reference to the first phase until a next first synchronization signal is received from the other inverter generator, and
the control unit is further configured to:
compare a third phase included in the first synchronization signal received by the communication unit prior to a polarity reversal timing of the second reference sine wave, with a fourth phase of the second reference sine wave when the first synchronization signal is received, and change a second phase change amount per unit time of the second reference sine wave in accordance with a comparison result, and predict a polarity reversal timing of the first reference sine wave by continually updating the fourth phase of the second reference sine wave so that the fourth phase of the second reference sine wave changes with the changed second phase change amount per unit time.

* * * * *